United States Patent [19]
Freepons

[11] Patent Number: 5,139,555
[45] Date of Patent: Aug. 18, 1992

[54] FERTILIZER PROCESSES AND COMPOSITIONS USING S-TRIAZINES

[75] Inventor: Donald E. Freepons, Kennewick, Wash.

[73] Assignee: Melamine Chemicals, Inc., Donaldsonville, La.

[21] Appl. No.: 777,455

[22] Filed: Sep. 18, 1985

Related U.S. Application Data

[60] Division of Ser. No. 552,024, Nov. 17, 1983, Pat. No. 4,559,075, which is a continuation of Ser. No. 305,394, Sep. 25, 1981, abandoned.

[51] Int. Cl.$^5$ .......................... C05G 5/00; C05C 9/00; C05C 9/02
[52] U.S. Cl. ............................................. 71/29; 71/30; 71/25; 71/64.05; 71/64.08; 71/903
[58] Field of Search .................... 71/11, 28, 64.11, 25, 71/29, 30, 64.05, 64.08

[56] References Cited

U.S. PATENT DOCUMENTS 4,421,545 12/1983 Crews ..................................... 71/30

OTHER PUBLICATIONS

MCI, Melamine, 1980—Melamine Chemicals Inc.
CA90(3):21456b Markin et al, 1977, "Melamine A Slow Acting Nitrogen Fertilizer".

Primary Examiner—Ferris Lander
Attorney, Agent, or Firm—Breiner & Breiner

[57] ABSTRACT

Process of furnishing slow release nitrogen to field soil comprising inserting and distributing in the soil in particulate or granular form melamine, ammeline, ammelide, cyanuric acid, mixtures thereof, their salts, and mixtures thereof.

18 Claims, No Drawings

FERTILIZER PROCESSES AND COMPOSITIONS USING S-TRIAZINES

This is a division of application Ser. No. 552,024, filed Nov. 17, 1983 now U.S. Pat. No. 4,559,075, Dec. 17, 1985, which is a continuation of Ser. No. 305,394, filed Sep. 25, 1981 and now abandoned.

BACKGROUND OF THE INVENTION

This invention relates to a new fertilizer process. The fertilizer material used in the process is characterized by poor solubility in pH 7 water at ambient temperatures in the soil and by slow conversion in the soil to a form in which it is useful to plant life growing in the soil.

Related subject matter is disclosed and claimed in copending application Ser. No. 483,383, filed Apr. 8, 1983, now U.S. Pat. No. 4,554,003, Nov. 19, 1985. This last-named application was a division of Ser. No. 305,394, filed Sep. 25, 1981, now abandoned.

There is a continuing search and need for improved fertilizer materials. For example, while ammonium nitrate, containing 34% N, still ranks second only to ammonia, 86% N, as a source of fertilizer nitrogen, its use generally has been decreasing, in terms of market percentage, since 1965. The reason is the increased use of the higher nitrogen content materials, ammonia, with 82% N, and urea, with 46% N, respectively. The use of urea is a development of recent years, and may have been prompted in part by a desire to reduce shipping costs.

All of these nitrogen fertilizer materials just mentioned are readily soluble in water. They are therefore subject to leaching, and their use results in a rapid release of their nitrogen. Since this necessitates repeated applications for sustained growth, or one application with higher leaching losses, there have been many developments relating to slow release nitrogen fertilizer materials. Generally such materials sacrifice nitrogen content for some degree of control over nitrogen availability.

Melamine and its hydrolysis products, ammeline, ammelide, and cyanuric acid, have often been considered as potential sources of nitrogen for incorporation in fertilizer compositions or for utilization as nitrogen sources per se. Melamine has a nitrogen content of 66.6%, so that about two thirds of its weight is nitrogen. If it could be used as a fertilizer material, it would obviously provide a good deal of nitrogen per unit weight applied. However, at present it is more expensive than urea. Moreover, commercially produced melamine is available only as a fine crystalline powder. It is manufactured in the form of very fine crystals because small size particles are required for the present commercial end markets for melamine, such as, for example, the production of melamine-formaldehyde resins and the production of fire retardant paints.

A typical screen analysis for one commercially available melamine, conducted with United States Standard Sieve screens, is as follows:

| Screen Analysis | Percent Retained |
|---|---|
| 40 Mesh | 0–0.1 |
| 40–50 Mesh | 0–0.1 |
| 50–60 Mesh | 0–0.3 |
| 60–80 Mesh | 0.5–5.0 |
| 80–100 Mesh | 1.0–5.0 |
| 100–200 Mesh | 13–30 |
| 200–325 Mesh | 13–30 |
| Thru 325 Mesh | 40–60 |

The commercially-produced small melamine crystals are desired by the resin producers because the small crystals dissolve more readily, and any larger particles, if present, would tend to require a longer processing time; therefore, the larger particles are less desirable. In the fire retardant paint market, the melamine crystals are dispersed in the paint, where the current fine particle sizes produce a smoother texture in the dried paint than would larger particles.

The fine particle sizes of the commercially available melamine products make melamine a product that is not very attractive for agricultural applications. The fine particles, if applied to the surface of the ground, would be blown away by even mild winds. If applied by air, as from an airplane or helicopter, drifting would be a serious problem and would cause uneven application. If applied through mechanical applicators, the fine particles would tend to form bridges and thus would plug transfer and dispensing lines. These difficulties in handling the commercially available melamine solids would make any large scale agricultural application impractical. Nevertheless, there have been many investigations into the possible use of melamine as a fertilizer nitrogen source, generally on a small scale where the limitations imposed by the fine particle size of melamine were not a serious obstacle. However, in most cases, negative recommendations were generated, for reasons having little or nothing to do with melamine's fine particle size.

In 1937, as reported in Industrial and Engineering Chemistry 29, 202–205, Scholl and three associates working within the U.S. Department of Agriculture evaluated melamine sulfate, melamine phosphate and melamine nitrate in connection with the growth in pots of fine loamy sand of wheat and millet. These salts were compared with other nitrogen sources, including cyanuric acid, urea, and, used in combination, sodium nitrate and ammonium sulfate. The sulfate and phosphate salts of melamine were reported to be substantially less soluble than melamine itself, whereas melamine nitrate was said to be slightly more soluble than melamine at 29° C. Melamine nitrate was considered to produce favorable results, but the results from the other two melamine salts were not so good. In pot growing tests with German millet and with Hungarian millet, the melamine nitrate salt gave the best results of the three melamine salts tested, and produced yields practically equivalent to those produced with control tests using urea and calcium cyanamide, but produced growth below those obtained with sodium nitrate. Finally, a series of nitrification tests were carried out with all three salts. The results obtained indicated that only about 1% of the nitrogen content of the melamine was converted to nitrate in Norfolk loamy fine sand during a period of 13 weeks. This is in contrast to a conversion of 80% observed with ammonium sulfate. All in all, the results obtained seem to have been discouraging, particularly as to possible fertilizer use of melamine per se.

In 1941, some evaluations of melamine and melamine salts were carried out at Kyoto Imperial University, as reported in a Japanese publication, 15 J. Sci. Soil Manure, 559 (1941), in an article entitled, "Studies on the Fertilizing Value of Melamines and Guanidines". In a ten week experiment in paddy soil, it was found that melamine ammonified very slowly because biochemical degradation of melamine proceeds at a very slow rate in the soil. The conclusions of the authors were essentially negative with respect to the fertilizer use of melamine and its salts in connection with rice and barley. The authors concluded these crops did not respond in a positive way.

West German patent 926,853, in 1954, suggested the use of melamine-formaldehyde resins as binding agents for granular fertilizer compositions also containing spent sulfite liquor and superphosphate. If field trials were made, they are not reported in the patent.

Very little nitrification of melamine was observed in a study by Clark et al. in 1957, as reported in Abstracts, 132nd Meeting, American Chemical Society, New York. Clark et al. reported that potassium and sodium cyanurates nitrified slowly for 6 weeks, followed by a more rapid and complete release of organic nitrogen between 6 and 9 weeks. Ammeline and mixtures of ammelide and ammeline nitrified at maximum rates between the 9- and 12-week incubation periods. Very little nitrification of melamine was observed over a 15-week period of incubation in soil media.

In 1961, T. G. Zarger published an article entitled, "Comparison of Slowly and Rapidly Available Nitrogen Fertilizers for Nursery Production of Pine Seedings", in Tree Planters' Notes No. 66, pages 8-10. Zarger stated that there had been some interest in slow-dissolving fetilizer forms that might make nitrogen available over a longer period of time, as compared to the standard nitrogen sources that had been used in the nursery for the previous several decades. The author reported a comparison between ammonium nitrate, ammonium sulfate, sodium nitrate, urea, and diammonium phosphate, as standard, readily soluble nitrogen sources, with melamine, oxamide, ureaform, and magnesium ammonium phosphate, as slowly soluble or practically insoluble nitrogen sources. All of these fertilizers were applied to nursery beds prior to seeding, at a uniform rate of 100 pounds of nitrogen per acre. The tests were conducted with both loblolly pine and short-leaf pine. The results obtained seemed to indicate that all other nitrogen sources are preferable by far to melamine for the production of loblolly pine seedlings, with somewhat similar results for the production of shortleaf pine seedlings. For average height growth and survival, melamine performed poorly with respect to both loblolly pine and shortleaf pine. The results were not as good as those obtained over a two year period with ammonium nitrate. The author apparently doubted that any nitrogen was available to the seedlings from either melamine or oxamide, and concluded that the nursery tests did not show any of the poorly soluble nitrogen sources to be any better than standard ammonium nitrate.

In 1964, Hauck and Stephenson published an article in Agricultural and Food Chemistry 12, 147-151, describing the rate at which symmetrical triazines converted in the soil to a form useful to plants. For evaluation, melamine phosphate and melamine nitrate were recrystallized, respectively, washed, and dried. What the authors refer to as granules of melamine, acid, and metal ion were prepared by forming dried pastes of the several materials, then crushing and screening. Such materials included mixtures, for example, of melamine and phosphoric acid, melamine and nitric acid, and melamine and ferric ammonium sulfate. In addition, the performances of melamine, ammeline, ammelide, and cyanuric acid were evaluated in silty clay loam, in particle form, and melamine and cyanuric acid were evaluated in solution. Although some degradation of all was observed, the authors pointed out that melamine and cyanuric acid degraded at a faster rate than either particles having sizes in the range from $-8+12$ mesh, or solutions. The authors concluded with what appears to be a very negative observation, that the evaluation of these materials as slow-release nitrogen sources should be made only on crops that are expected to respond to small amounts of nitrogen added at frequent intervals. In addition, the authors reported that cyanuric acid is temporarily toxic to seedlings.

Also in 1964, Terman and several co-authors reported in Agricultural and Food Chemistry 12, 151-154 (1964) that they had evaluated urea and reagent grades of melamine, ammeline, ammelide, and cyanuric acid, for crops of corn forage and for crops of Coastal Bermuda grass, grown in greenhouse cultures. They confirmed that cyanuric acid was toxic initially. They found that urea and its pyrolyzate products were generally superior as to corn response, grass response, and also when evaluated in field experiments with wheat. The results can best be described as mixed with respect to the symmetrical triazines. Cyanuric acid was apparently considered a possible candidate for use if applied two weeks or more in advance of planting, to avoid the toxicity problem. Ammelide and ammeline, and urea pyrolysis products as well, were considered to be equal or superior to fertilizer-grade urea-formaldehyde resins as sources of nitrogen for Bermuda grass. They were also considered as possible nitrogen sources for use for tree and shrub fertilization. The findings with respect to melamine itself were generally negative. In the corn experiments, the authors measured nitrogen uptake and total dry weight, concluding that melamine did not supply an appreciable amount of nitrogen to the crop regardless of the amount of melamine applied. Measurements taken on the dry weight of Bermuda grass clippings indicated to the authors that no appreciable amount of nitrogen was supplied to the grass by melamine. In the field test with wheat, the authors measured the pounds per acre of dry forage, and found that small, insignificant increases in yields were obtained from melamine, the mean yields being only slightly higher than yields where no nitrogen source was applied at all. The authors concluded that melamine was only about 10% as effective as urea.

More recently, East German patent 120,645 described the use of a polymer coating on prilled urea to provide a slow-acting fertilizer. Prills having an average particle diameter of 1.7 mm. were pretreated with a coating substance or solution, dried, fluidized, and then coated with a latex polymer at 60° C. Melamine was mentioned as one of the possible pretreating substances. The coated pellets had particle sizes in the range from 0.5-5 mm, preferably, 1-3 mm.

Even more recently, a publication in the Russian language reports results from an evaluation of melamine as a fertilizer in connection with one variety of spring barley: Markin et al., Tr. Slavrop S-kh Inst. 40(3), 65-67 (1977; CA 21454b (1979). As understood, the Russian investigators compared the degradation of melamine with other standard materials, including ammonium nitrate, in black earth (carbonate chernozem) from the Caucasus foothills. In addition, greenhouse tests were carried out in containers of the same soil. As might be expected from prior work, melamine at no point produced a nitrate level as high as that produced by ammonium nitrate.

The results reported are difficult to interpret. The control (background) apparently was fertilized with superphosphate. It is not clear whether the comparison trials using ammonium nitrate and melamine respectively had superphosphate in the soil or not. The composting experiment was run without the addition of fertilizer to the soil for the control. The spring barley greenhouse experiments apparently were run with the addition of superphosphate for the control experiment. In any case, the harvest, in the version with ammonium nitrate added, was at the same level as the control (background), according to the text. The trials with melamine were considered to produce "significantly higher" results both as to total harvest and as to grain harvest than with ammonium nitrate. Further, the author reports that melamine had a favorable long term effect, in that when all of the containers were planted again with spring barley, and observations of growth and development were continued up to the point where head formation occurred, there reportedly was an increase in the yield of barley, dry weight basis, as compared to the use of containers of the background type and of the type having background together with ammonium nitrate.

Because of the lack of details about experimental techniques and because of the very few trial runs made during the work that is reported, it is difficult to evaluate what was done by the Russian investigators and the conclusions that they reached.

U.S. Pat. No. 3,705,019, describes the production of granular cyanuric acid from fine cyanuric acid powder particles, to produce fast dissolving granules for treating the water in swimming pools. It has nothing to do with fertilizer.

Subsequently, Corte et al. in U.S. Pat. No. 4,083,712, produced nitrogenous fertilizers in the form of salts of a cation exchange resin. In Example 3 of the patent, a sulfonated polystyrene cross-linked with divinyl benzene, in the hydrogen form and strongly acidic, was reacted with an aqueous suspension of melamine. The reaction product was said to consist of 1000 ml. of a nitrogenous fertilizer containing 2.2 moles of melamine per liter. This material, and other ion exchange resin salts produced from guanidine and other nitrogen compounds, were tested over a two year period with grass in pots of loamy sandy soil which had received a basic dressing of phosphorus and potash. The first year grass yield is reported in the patent, although it is not clear what basis was used for determining the yield. All of the salts used produced results that seemed to be superior to those produced with control materials, after both one year and two year tests. In addition, based on the data reported, the melamine salt appears to have produced a superior yield to other salts, and to the control, after two years.

In what appears to be a subsequent development, described in South African patent 735,583, Corte and his associates pursued their investigations further. More work is described with nitrogenous fertilizer salt compositions comprising a cation exchange resin having a nitrogen base such as melamine chemically bound thereto. The cation exchanger optionally may be partially charged with a material such as melamine, and partially with inorganic nutrient ions. In Example E of this patent, a three year old lawn was used for testing different sources of long term fertilizer nitrogen. In one group of tests, the nitrogen was entirely furnished by a "conventional long-term" fertilizer, crotonylidenediurea (CDU). CDU is a condensation product of crotonaldehyde and urea. It is difficulty soluble in water. In a second, comparative test, the fertilizer was a mixture of 80% by weight of this long-term fertilizer material with 20% of a melamine ion exchange salt fertilizer. In a third test, the fertilizer nitrogen was supplied by a mixture of 60% of the long-term fertilizer material, crotonylidenediurea, with 40% of the melamine ion exchange salt fertilizer. The sum of the weights from five cuttings of this grass in grams per square meter was, for each of these three tests respectively: 1654; 1757; and 1899. Corte et al. observed that after 3 months, the conventional long term fertilizers evaluated were used up, whereas with the ion exchange salts, "no signs of exhaustion" were detectable after five months.

Both of these patents of Corte et al. point out that certain slow release nitrogen sources, such as urea-formaldehyde resins, have been combined with a short term nitrogen fertilizer material, such as a nitrate, to provide a greater initial fertilizing effect. Corte et al. observed, however, that melamine, unless chemically reacted to become the salt of an ion exchange resin, was "unsuitable for fertilizing purpose", U.S. Pat. No. 4,083,712, col. 2, lines 58–61.

The Allan Belgian patent, 885,166, published Sep. 30, 1980, describes one way to improve the commercially available crystalline melamine for fertilizer use. The commercial product apparently contains one or more unidentified phytotoxic impurities. The impurities are removed by washing with room temperature water, at least once. The melamine, being very poorly soluble in water, remains in crystalline form, whereas the toxicant is more soluble and is carried off in the wash water. Tests reported in the Belgian patent demonstrate that the washed melamine has reduced toxicity as compared to its unwashed commercially available counterpart.

Because of the generally negative or equivocal results reported, based on the limited amount of work done to date with melamine, its related triazines, and their salts, little or no work has been done that has been concerned with the modes of application or physical forms of these materials. On the contrary, the work done has been addressed to the question of whether these triazine compounds and their salts are in fact useful sources of nitrogen, and in general, the most frequent conclusion reached was that they were not. Consequently, apparently no one to date has investigated techniques of application, to see if any differences in result could be observed. Perhaps such work has been inhibited by the knowledge that many substituted s-triazines are sufficiently toxic to plant life that several are used commercially as herbicides (see the Gysin et al. patents, for example, U.S. Pat. No. 2,909,420, 2,920,421, 2,923,614 and 2,936,277), and by the several reports as to the toxicity of the s-triazines themselves, as in the Allan Belgian patent 885,166, discussed above.

SUMMARY OF THE INVENTION

This invention, in one embodiment thereof, relates to a process for furnishing a slow release source of fertilizer nitrogen to field soil. This process involves inserting into and distributing within the soil, in the root zone, often at a depth of from about 75 millimeters (about 3 inches) to about 360 millimeters (about 14 inches) a granular fertilizer as described above. The granular fertilizer may be spread over the surface of the bed, and then mechanically worked into the soil as by turning over the soil by plowing or discing.

In this process, the total rate of application is preferably such as to insert enough total long term fertilizer nitrogen for an entire growing season. A primary advantage of this process is that the rate of application of the fertilizer generally is less than one-half of that needed to achieve comparable results when ammonium sulfate is employed as the sole source of nitrogen and is applied as a solution through an irrigation sprinkler system.

The process of the invention is useful for increasing the productive units from a crop that responds to fertilizer nitrogen. This process comprises furnishing at least 50%, and preferably about 90%, of that nitrogen in the form of a particular fertilizer nitrogen source selected from the group of materials consisting of melamine, ammeline, ammelide, cyanuric acid, mixtures thereof, their inorganic salts, their organic salts and mixtures thereof.

In one preferred embodiment of this invention, the process involves distributing a slurry of fine melamine crystals in water as a broad, ribbon-like layer beneath the soil.

In another preferred embodiment of the invention, fine melamine particles, or granules of the fine particles held together with a binder, are distributed over the surface of the soil, then turned under to distribute them through the root zone.

In each of these preferred embodiments, the fine particles of the poorly soluble nitrogen source are distributed throughout the soil, in the root zone, subject to the action of water and of microorganisms. It has been found that this leads to excellent results, i.e., the elimination of the need for repeated nitrogen feedings, an increase in productive units, and possible economies.

Another preferred technique for practicing the invention is to apply the fertilizer material to the soil surface, wet it thoroughly as with water from an irrigation sprinkler, then turn it under to distribute it throughout the root zone.

Depending upon the application and distribution techniques employed, the fertilizer material may be in the form of granules. Such granules can be fabricated to have strength, sizes, and weights that are suitable for dispensing mechanically for application to and into the soil. The preferred size range for such granules is from about 1 millimeter to about 10 millimeters, and the most preferred size range is from 3 mm. to 5 mm.

These fertilizer granules comprise a poorly soluble nitrogen source from the group named above, and a binder. The nitrogen source is characterized by fine particle sizes not above about 10 mesh, by poor solubility in pH 7 water at 20° C., and by slow conversion in the soil to a form in which it is useful to plant life growing in the soil. The binder is present in an amount at least sufficient to bind together the fine crystals or powder particles of the nitrogen source, to form granules having the desired strength. It may be a readily soluble material that, after distribution of the granules in the soil, releases the nitrogen source particles to permit the action of water and microorganisms on the particles. The binder is selected to be compatible with the soil, and any residue of the binder should be either inert, biodegradable, soil conditioning or have plant nutrient value.

Granular agglomerates for use as a source of fertilizer nitrogen, from fine particles of a nitrogen source selected from the group of materials described above, may be made by applying a small but effective amount of a binder, to bind fine particles of the nitrogen source together. The binder is then hardened or permitted to harden and the agglomerates are screened to produce product agglomerates having sizes in the range of 1 millimeter to 10 millimeters, preferably. Over-sized particles can be crushed to size, and fines can be recycled.

The binder may also be a relatively insoluble material such as a lignin sulfonate, a synthetic or natural polymer applied in the form of a solution or an emulsion, or it may be a solidified soluble material having plant nutritive value such as, for example, urea, ammonium nitrate, or a combination of such materials. Suitable granular fertilizer products may also be made from fine particles of a nitrogen source selected from the group of materials described above, together with a binder that is hardened from the molten state and that enrobes the particles. Such granular products are referred to hereafter as prills.

The fertilizer process of the invention is useful for increasing the productive units from a crop that responds to fertilizer nitrogen. This requires furnishing at least 50%, and preferably about 90%, of that nitrogen in the form of a particulate fertilizer nitrogen source selected from the group of materials described above, in combination with a soluble or fast-release standard nitrogen fertilizer material such as urea or ammonium nitrate. The granular form of fertilizer product permits the application of both the slow release and fast release sources of nitrogen in a single application of granules. The term "productive units" is used to refer to the desired crop product.

The process of this invention is useful for such diverse crops as food grain, feed grain, legumes, fiber crops, vegetable oil and nut oil yielding crops, root crops, tuber crops, tree fruits including citrus fruits, tree nuts, vine fruits, bush fruits, commercial vegetable crops, commercial melon crops, and flowers. Particularly interesting results have been obtained in practising this process in connection with wheat, corn, rice, and potato crops.

DEFINITIONS

The term "granular" is employed herein to refer to both agglomerates and prills. Agglomerates are formed by mechanically bonding fine particles together using a binder. Generally the binder is applied as an aqueous solution, and dried to cause binding. Screening and recycling are used to achieve desired sizes. Prills are formed by mixing fine particles in a molten binder material, then chilling drops of the mixture.

The term "poorly water soluble" refers to materials that dissolve in water at 20° C., pH 7, to the extent of 5 grams per 100 grams, or less; that is, materials that form solutions of 5% or less concentration.

The term "slightly water soluble" refers to materials that dissolve in water at 20° C., pH 7, to the extent of 1 gram per 100 grams or less; that is, materials that form solutions of 1% or less concentration.

The term "readily water soluble" refers to materials that dissolve in water at 20° C., pH 7, to the extent of 20 grams per 100 grams or more, that is, materials that form solutions of 20% or greater concentration.

Based on available information, the solubilities in water at 20° C., pH 7, for several materials useful in connection with this invention, in grams per 100 grams are:

TABLE I

| Solubility Data | |
|---|---|
| Material | g/100 g |
| melamine | 0.50 |
| ammeline | 0.008 |
| ammelide | less than 0.008 |
| cyanuric acid | 0.27 |
| melamine nitrate | 0.85 |
| ammonium nitrate | 192 |
| ammonium sulfate | 75.4 |
| diammonium phosphate | 131 (at 15°) |
| potassium acid sulfate | 51.4 |
| potassium sulfate | 11.1 |
| urea | 119.3 (at 25° C.) |

The term "fugitive" is used to refer to a vehicle that goes into the soil. The aqueous vehicle of a melamine slurry, for example, simply soaks into the soil, leaving the melamine particles behind. Such a vehicle may contain plant nutrients, such as urea or ammonium nitrate, and may contain suspending agents.

DETAILED DESCRIPTION OF THE INVENTION

This application discloses and claims subject matter that is closely related to subject matter disclosed and claimed in the companion patent application of G. Graham Allan, Donald E. Freepons and George M. Crews, Ser. No. 305,603, filed Sep. 25, 1981, that is being filed substantially contemporaneously herewith. The Allan, Freepons and Crews application discloses that the s-triazine particles and/or those of their salts are most conveniently handled and dispensed when in granular form having sufficient strength, size, and weight for use in modern mechanical dispensing equipment. That application describes fertilizer products in granular form, with sizes in the range from about 1 mm. to 10 mm., preferably 3 mm. to 5 mm, and processes for making them. They are made up to have good drillability, a desirable apparent specific gravity, and to be substantially free from dusting. The disclosure of that application is incorporated herein by reference.

This invention, in one embodiment thereof, relates to a process for furnishing a slow release source of fertilizer nitrogen to field soil. This process involves inserting into and distributing, in as uniform a fashion as is practicable, within the soil, in the root zone, often at a depth of from about 75 millimeters (about 3 inches) to about 360 millimeters (about 14 inches) a particulate fertilizer as described above. The particulate fertilizer may be spread over the surface of the soil, and then mechanically worked into the soil as by turning over the soil by plowing, discing, rototilling or the like.

In this process, the total rate of application is preferably such as to insert enough total long term fertilizer nitrogen for an entire growing season. A primary advantage of this process is that the rate of application of the fertilizer generally is less than one-half of that needed to achieve comparable results when ammonium sulfate is employed as the sole source of nitrogen and is applied as a solution through an irrigation sprinkler system.

In each of the embodiments of the invention, fine particles of a poorly soluble nitrogen source are distributed throughout the soil, in the root zone, to be subject to the action of water and of microorganisms. It has been found that this technique leads to excellent results, i.e., the elimination of the need for repeated nitrogen feedings, an increase in productive units, and possible economies.

The "root zone" for some crops is from 6" to 14" below the surface, a depth of distribution, conveniently achieved by surface broadcasting, then plowing. For some plants, the root zone begins at about 3" below the surface. Distribution is then conveniently achieved by broadcasting on the surface, then preferably soaking the soil as with irrigation water, then discing under. For shallow-rooted plants or seedlings, the root zone is closely adjacent the surface, and in this case, broadcasting and soaking, followed by rototilling, represents a preferred mode of application.

Generally the preferred technique for practising the process of the invention is to apply the fertilizer material to the soil surface before planting, wet it thoroughly as with water from an irrigation sprinkler, then turn it under to distribute it throughout the appropriate root zone. The fertilizer material is a particulate fertilizer nitrogen source selected from the group of materials consisting of melamine, ammeline, ammelide, cyanuric acid, mixtures thereof, their inorganic salts, their organic salts and mixtures thereof.

In one preferred embodiment of this invention, the process involves distributing a slurry of fine, discrete melamine crystals in water as a broad, ribbon-like layer beneath the soil, in which the individual crystals preferably are separate, or spaced apart from each other, and not agglomerated.

In another preferred embodiment of the invention, fine melamine particles, or granules of the fine particles held together with a binder, are distributed over the surface of the soil, then turned under to distribute them through the root zone.

When the fertilizer material is in the form of granules, such granules can be fabricated to have strength, sizes, and weights that are suitable for dispensing mechanically for application to and into the soil. The preferred size range for such granules is from about 1 millimeter to about 10 millimeters, and the most preferred size range is from 3 mm. to 5 mm.

These fertilizer granules comprise a poorly soluble nitrogen source from the group named above, and a binder. The nitrogen source is characterized by fine particle sizes not above about 10 mesh, and generally, by particle sizes essentially less than about 40 mesh. In the case of melamine, the screen analysis reported above indicates that for one commercial melamine, a majority of the particles are less than 200 mesh, which is very fine. Such fine particles are difficult to handle except in a continuously agitated aqueous slurry, or as a suspension in an aqueous vehicle. For this reason, granular forms are often more convenient to use in the process of the invention, i.e., they can be mechanically dispensed and applied with greater convenience and efficiency.

Granular fertilizer products useful in the process of the invention may be in the form of agglomerates or prills. The agglomerates may be made by any conventional technique for agglomerating fertilizer products, utilizing the poorly or slightly soluble fertilizer nitrogen sources of the present invention. Thus, the poorly or slightly soluble nitrogen source in an agglomerate is selected from the group consisting of melamine, ammeline, ammelide, cyanuric acid, mixtures thereof, their inorganic salts, their organic salts, and mixtures thereof. These salts are preferably selected from the group consisting of the hydrochloride, hydroiodide, metaphosphate, nitrate, orthophosphate, orthophosphate dihydrate, polyphosphate, potassium dihydrogen phosphate, bisulfate, and sulfite, and, as well, the acetate, cyanurate, chloroacetate, formate, benzoate, fumarate, lactate, maleate, and phthalate, and mixtures thereof. These materials are characterized by poor or slight solubility in pH 7 water at 20° C., and by slow conversion in the soil to a form in which the nitrogen is useful to plant life growing in the soil.

These nitrogen source materials, as ordinarily available commercially or as prepared, are in the form of very fine particles. In the case of melamine, for example, the commercially available product typically has crystalline particles that are smaller in size than 10 mesh, U.S. Standard Sieve size, and generally, mostly smaller than 40 mesh. These very fine, powdery nitrogen source materials are agglomerated through the use of a binder. Generally the binder forms at least 1% by weight of the powdery particles, preferably at least 2% by weight of the powdery particles, and more preferably, at least 5% by weight of the powdery particles. The binder may be selected from a broad spectrum of materials, but preferably is selected to be compatible with the soil so that it and any residue thereof is either inert, biodegradable, soil-conditioning, or has some plant nutrient value.

The binder that is used should be sufficiently strong, upon hardening or curing, to impart to the granular agglomerates a crush strength of at least one pound, as determined by tests on ten agglomerates randomly selected, with sizes in the range from 3 mm. to 4 mm., the results being averaged. Preferably, however, the crush strength is at least 1.5 pounds, and more preferably, 2 pounds or higher. A crush strength of about 1 pound is comparable to conventional, commercial prilled urea and is adequate strength for use in most forms of commercial application, including broadcast devices, spreaders, planter shank applicators, and for dispensing from airplanes and helicopters.

Among the preferred binders are those selected from the group consisting of lignin sulfonate and its salts, starch, urea, urea-formaldehyde resins, melamine- formaldehyde resins, and latices of synthetic polymeric materials. Those binders are most preferred that have plant nutrient value, as do urea, urea-formaldehyde and melamine-formaldehyde resins. If such binders are essentially water-insoluble, they form granules that can be applied in the form of an aqueous slurry, if desired, as well as broadcast by a spreader, airplane, or other conventional mechanism.

In another agglomeration technique, the melamine powder is combined with a suitable amount of a readily soluble binder material, i.e., for example, with from 5% to 25% by weight of powdered urea to form a blend. This blend is then sprayed with water or with a solution of urea, in an agglomerating device such as on a rotating disc or in a rotating drum. In the case of a binder solution, the particles are coated. In the case of a water spray, the urea either goes into solution or becomes moistened and tacky, and in either state, coats the powdery melamine particles sufficiently to cause agglomeration to occur. The agglomerates are dried and cooled, to form hard composites having sizes primarily in the range from about 1 mm. to about 10 mm., and preferably 3 mm. to 5 mm. These composites have good crush strength and are substantially free from dusting.

Any of the conventional agglomerating techniques can be used to make useful granules. Thus, all of the binder can be applied in solution. When the binder is a material such as lignin sulfonate, urea-formaldehyde resin, or melamine-formaldehyde resin, application in the form of a solution is usually most convenient. The binder might also be a material such as a phenolic resin, applied from a solution, but such a material, while having excellent characteristics as a binder, has no nutrient value to contribute and is therefore less desirable. The same considerations apply generally to synthetic polymer latices.

The fertilizer granules may also be made in the form of prills. In the prilling operation, melamine powder is added to a molten binder material, preferably urea, to form a slurry of the melamine powder particles in the molten urea. Droplets of this molten slurry are solidified by dropping them through a prillintg tower, in the conventional fashion. While urea is the preferred material for use in preparing prills, because of its nitrogen content and ready solubility in water, and also because melamine is somewhat soluble in molten urea, other material such as sulphur could also be used, and mixtures of materials could be used. In forming urea-bound prills, the prill product should contain at least 33% by weight of urea, for adequate strength. When less urea is present, it is difficult to prepare a flowable slurry. The urea content of the prill may be as high as 90%, so that the melamine content may be in the range from 10% to 67% by weight of the prills. Preferably, the urea content is from 35% to 60% by weight of the prills, and more preferably, from 40% to 50% by weight. In terms of nitrogen availability from a prilled urea-melamine product, the urea generally will contribute from about 25% to about 50% or more of the total nitrogen, but preferably contributes about 30% to 50%.

While preferred granular products are produced by agglomeration and prilling, satisfactory products can be produced by other techniques, including extruding techniques, pressing and granulating, and bricquetting. For example, melamine powder, or a powdered melamine salt, or the like, can be combined with a urea-formaldehyde resin in powder form to form a mixture. The mixture can be pressed at an elevated temperature to cure the resin, and the resulting product can be granulated to form particles of the desired size, or the pressed, cured mass can be converted to flake form. Screening and recycling can be used as necessary to develop granules of the desired sizes.

Readily soluble binders such as urea and salts such as ammonium nitrate permit rapid disintegration of the binder of the fertilizer granules in the soil, with release of the fine melamine crystals or other material from the group named above. This may be desirable where the composite contains not only melamine but also a readily soluble, fast release nitrogen fertilizer material. Where slow release is desired, then ordinarily one of the binders is employed that loses binding power more slowly in the soil, such as, for example, a urea-formaldehyde resin or a melamine-formaldehyde resin.

Urea is a preferred binder for agglomerates, or for making prills, because it not only permits the production of fertilizer granules of sufficient size, strength and weight for convenient application, but in addition, the urea is readily soluble and adds valuable fast release nutrient material to the soil. When used with a powdered nitrogen source characterized by poor or slightly solubility and slow conversion in the soil to a useful form, the urea dissolves rapidly and releases the fine particles of the poorly soluble nitrogen source into the soil, subject to the action of water and of microorganisms, for slow dissolution or biodegradation.

When an agglomerate is prepared from powdered melamine and a readily water soluble binder such as urea, preferred proportions in the dried granular product obtained are from 60% to 85% by weight of melamine and from 40% to 15% by weight of urea, or more preferably, from 67% to 80% by weight of melamine and from 33% to 20% by weight of urea.

When an agglomerate is produced using an insoluble or only slightly soluble binder such as starch, a derivatized starch, or a modified starch, lignin sulfonate, urea-formaldehyde, or melamine-formaldehyde, or one of the non-nutrient materials such as a phenolic resin, or a synthetic polymer in the form of a latex, a very slow release of nitrogen from the melamine particles (or particles of other poorly soluble nitrogen source) is obtained.

When a granular fertilizer product is used having a readily water-soluble, fast release nitrogen fertilizer material as a binder, or when fine particles of a poorly water-soluble nitrogen source from the group above named is used in conjunction with a readily water-soluble, fast release nitrogen material, good results can be obtained at comparatively low total nitrogen application rates, as will be described presently. The readily water-soluble, fast release material may be separately applied, but preferably is applied simultaneously with the poorly soluble nitrogen source. Thus the readily soluble fast release material may be in solution in an aqueous medium in which the melamine or other particles are slurried or suspended. For the production of an agglomerate permitting a single application per growing season, fast release nitrogen fertilizer materials, generally an ammonium salt or urea, are advantageously used as the binder of the agglomerate. Examples of such salt-type binder materials are ammonium sulfate, potassium sulfate, ammonium phosphate, diammonium phosphate, the potassium phosphates, ammonium nitrate, potassium nitrate, potassium chloride, and ammonium chloride. When used as a binder material in the formation of an agglomerated composite, the proportion of such salt-type binder material may be from 15% to 40% by weight of the agglomerate, and preferably is from 20% to 33% by weight of the agglomerate. In terms of nitrogen availability, the fast release salt generally will be present in an agglomerated product, such as an agglomerate of melamine particles, in an amount such that it provides from about 5% to about 30% by weight of total nitrogen, and preferably, from about 7.5% to about 25% total nitrogen.

In addition, other materials may be incorporated in a granular fertilizer product. Such materials may provide micronutrients such as zinc, magnesium, iron and boron.

One of the advantages of the use of fertilizer compositions, applied in accordance with the present invention, is that the rate of application may be much lower in terms of nitrogen applied per acre than is true with standard fertilizer practice. Because less of the active nitrogen sources material is actually needed, it may be desirable, to facilitate application, in some cases, to incorporate an inert filler. Any of the conventional filler materials may be employed, such as, for example, gypsum, clay, sand, ground sea shells, ground dolomite, and ground limestone.

Another important advantage of the use of fertilizer products applied in accordance with the present invention is that, because of the slow release characteristics, it is possible to employ only a single application per growing season. In addition, after the initial application, in the case of melamine-based fertilizer products in particular, the release of nitrogen values into the soil appears to continue over two growing seasons. Consequently, in the second and subsequent growing seasons, even lower rates of application may be employed for given results, than may be used for the initial application.

Another aspect of the invention is the unexpected and surprising finding that furnishing a majority or all of the nitrogen fertilizer requirements by a nitrogen fertilizer source in accordance with the present invention apparently leads to a more effective production of agricultural productive units per unit weight of nitrogen applied, and per unit of growing area. An agricultural productive unit is a seed, fruit, flower, vegetable, vegetable fiber, tuber, or the like. In addition, the practice of the invention apparently leads to overall yields of plant units comparable to those obtained when following conventional, standard fertilizer practice, with its requirement for the use of much higher nitrogen fertilizer application levels.

Based on the published literature, it would be expected that the use of melamine, or other s-triazine, or of an s-triazine salt, as a nitrogen fertilizer source, would be found to be less effective than urea or other standard readily soluble, fast release source of fertilizer nitrogen. The results observed where nitrogen is furnished in accordance with the present invention indicate that it often may be as much as two or more times as effective as nitrogen from standard, fast release, readily water-soluble commercial fertilizers. It can be theorized that the fertilizer nitrogen sources of the present invention function in some novel way previously unknown and unrecognized.

Unexpectedly superior results are apparently obtained through the application of fertilizer in accordance with the present invention, in which the soil is furnished with a combination of poorly soluble nitrogen material selected from the group of materials described above, and a conventional, readily water-soluble, fast release nitrogen fertilizer material. These superior results are manifested in two ways. First, an increased number of productive units is produced per unit area. For wheat and rice, increased tillering appears to occur. With grapes, an increased number of clusters per vine apparently is produced. For potatoes, an increased number of tubers seems to appear per unit length of row. Second, the total overall weight of these productive units for a given area apparently is increased. All of this is achieved at a reduced rate of application of nitrogen per acre as compared to standard fertilizer practice, and generally with only a single application of nitrogen fertilizer needed per growing season.

While not wishing to be burdened by theory, it is believed that when melamine is used, it is slowly sequentially degraded in the soil to ammeline, ammelide and cyanuric acid and ultimately to urea and nitrates. Each of the three s-triazine hydrolysis products of melamine, and the s-triazine salts, undergo similar degradation. However, it is not certain if any one, or some combination, of these s-triazines or their salts may be responsible for the unusual effects observed, in field evaluations.

In broad terms, this invention may be considered, in one aspect, as a process for increasing the effectiveness of standard readily soluble, fast release nitrogenous fertilizers in generating productive units in agricultural crops by supplementing their action with the use of a slow release, poorly or slightly soluble fertilizer nitrogen source. Thus, a combination of from about 10% to about 50% of the nitrogen in a standard readily water-soluble, fast release nitrogenous fertilizer may be combined advantageously with from about 50% to 90% of a fertilizer nitrogen source selected from the group of poorly and slightly soluble materials recited above.

The agricultural crops expected to respond with increased productive units to treatment in accordance with the invention include substantially all crops, but particularly those where fruit is the harvested unit rather than the entire plant. Such crops include food grains, feed grains, legumes, fibers, root crops, citrus, tubers, oil-bearing units including nuts, fruits and seeds, commercial vegetables, commercial melons, tree fruits, vine fruits, bush fruits and flowers. Exemplary food grains include wheat, rye, and rice. Feed grain crops include field corn, oats, barley and sorghum. Legumes include soybeans, peanuts, beans and peas. Fiber crops include cotton, hemp and jute. Root crops include sweet potatoes and sugar beets. Citrus crops include oranges, tangerines, grapefruit, lemons and limes. Tuber crops include potatoes. Oil crops include flax, safflower, sunflower, and castor bean. Commercial vegetable crops include lima beans, snap beans, beets, carrots, sweet corn, cucumbers, onions, green peas, and tomatoes. Commercial melon crops include cantaloupes, honeydews and watermelon. Tree fruit crops include apples, peaches, pears, cherries, and plums. Vine fruits include grapes. Bush fruits include the many different kinds of berries, especially raspberries and blueberries. Tree nut crops include almonds, filberts, pecans and walnuts. These are intended to be exemplary only.

The invention will be better understood by reference to the following examples. Throughout this application and in these examples, all references to parts and percentages are by weight, and all references to temperatures are in degrees Celsius, unless expressly stated otherwise.

EXAMPLES OF THE FORMATION OF GRANULES THAT ARE USEFUL IN THE PROCESS OF THE INVENTION

In all of the following examples, the melamine used was the commercially available product of Melamine Chemicals, Inc., Donaldsonville, La. It was a fine white crystalline powder having a screen analysis substantially as reported above for commercially available melamine. It was about 99.9% pure, with specifications of a maximum moisture content of 0.1%, maximum ash of 0.01%, and a density of about 1.57 g/ml.

As is pointed out in some of the following examples, crush strengths of 1 lb. or greater are preferred. More preferably crush strengths of 3 lbs. or more are developed, to facilitate application. Also, the bulk density of the granules should be 40 lbs./ft.$^3$ or more. The preferred combination of bulk density, crush strength, and particle size makes for flexibility in and ease of application.

EXAMPLE 1

Melamine Agglomerates Using a Urea Binder

Three batches of composite granules were made up, each containing different amounts of urea and melamine, with urea serving as the binder. These batches of agglomerated granules were made in a pan agglomerator of 9" diameter. The urea was first ground, and then blended with the melamine powder to form a homogeneous mixture. The powder mixture was fed to the pan agglomerator and sprayed with a nearly saturated solution of urea and water. The solution added about 7% urea to the dried agglomerate. The remainder of the urea content was derived from the urea powder in the urea-melamine powder mixture.

Crush strengths of the three batches of granules after drying are shown in Table II, along with that of a comparison sample of commercial urea prills. Crush strength was determined by randomly selecting ten granules of 3 to 4 mm. in diameter from each batch, and subjecting each of these ten granules to pressure until crushing occurred. The ten values were averaged, and the average value is that reported in Table II below.

TABLE II

| | Urea-Melamine Granule Crush Strength (Avg.) | | | |
|---|---|---|---|---|
| | Batch No. 1 | Batch No. 2 | Batch No. 3 | Comparison-Urea Prills |
| % Urea per batch, total | 12 | 17 | 27 | 100** |
| % Melamine | 88 | 83 | 73 | 0 |
| Crush Strength (lbs.) | 1.9 | 2.9 | 3.0 | 1.1 |
| % total N contributed by Urea | 8.6 | 12.4 | 20.3 | 100 |

**Commerically available urea prills.

EXAMPLE 2

Melamine Agglomerated with Urea Powder; Water Spray

One batch of agglomerated granules was prepared in a pan agglomerator as in Example 1, except that all of the urea was added as a powder, and the spray applied at the pan consisted only of water. The resulting composites contained 80% melamine and 20% urea, and after screening to 3-4 mm., were found to have a crush strength of 2.1 lbs., using the same testing technique as in Example 1.

EXAMPLE 3

Use of Other Binders for Agglomerating Melamine

Granular agglomerates were prepared with a 16" pan agglomerator using melamine with several different binders. In each case, the binder, in liquid form, was sprayed on the melamine. After drying, crush strength was determined as in Example 1. The results are reported in Table III, below.

TABLE III

| Crush Strengths Observed Melamine Agglomerated with Different Binders | |
|---|---|
| Binder | Crush Strength, lbs., of 3-4 mm. Agglomerates |
| Calcium lignin sulfonate[1] | 2.0 |
| UCAR 368 latex[1] | 1.5 |

TABLE III-continued

Crush Strengths Observed Melamine Agglomerated with Different Binders

| Binder | Crush Strength, lbs., of 3-4 mm. Agglomerates |
| --- | --- |
| Melamine-formaldehyde resin[1] | 3.4 |
| Urea-formaldehyde resin[1] | 1.0 |
| Diammonium phosphate (DAP)[2] | 0.2 |
| Ammonium nitrate[2] | 0.33 |

[1]Applied at 30%-50% solids. The dried agglomerates were about 5% binder.
[2]Substantially saturated solutions used. The dried agglomerates were approximately 93% melamine, 7% salt.

EXAMPLE 4

Melamine Agglomerates With a Filler

Agglomerated granules were prepared by mixing a filler (waste filter aid) with melamine in equal proportions, then spraying the mixture in a 16" pan agglomerator with a lignin sulfonate solution at 30% solids. After drying and screening, the resulting 3-4 mm. granules had a crush strength of 0.75 lbs., determined as in Example 1.

EXAMPLE 5

Melamine Agglomerates

A mixture of melamine was granulated using a 40% solids urea-formaldehyde spray. The dried screened products have a crush strength of 1.0 lbs. in the 3-4 mm. diameter size range. Binder content was approximately 5% by weight.

EXAMPLE 6

Melamine Agglomerated with other Fertilizer Materials

Melamine, ammonium phosphate, and potassium chloride were blended together in a 70:15:15 weight ratio. The mixture was fed to a 16" pan agglomerator and sprayed with a 30% solids lignin sulfonate solution. The dried, screened granules had a crush strength of 2.2 lbs. in the 3-4 mm. size range, and a binder content of 3%.

EXAMPLE 7

Melamine in Matrix of Solidified Urea Binder

Melamine and urea powder were blended in a 63-37 ratio. The blend was heated until a molten slurry was obtained. The slurry was then poured onto a cooling slab so as to form both a thin film and a thick film. After cooling the thin film was broken into flakes.

The thick film, of about 4 mm. thickness, was broken into granules. The crush strength of the 3-4 mm. granules was exceptionally high, at 5.5 lbs.

EXAMPLE 8

A Pressed Melamine-Urea Composite

A melamine-urea blend was formed as in Example 7. This blend was then placed in a heated platen press at about 500 psi for 5 minutes, at 280° F. The resulting hot composite, in the form of a sheet about 4 mm. thick, was then removed from the press and allowed to cool. The cooled sheet was granulated, and 3-4 mm. granules of the composite has a crush strength of 5.5 lbs.

EXAMPLE 9

Melamine-Urea 60/40 Prills

Melamine composite prills were prepared by heating 40 parts urea by weight with 60 parts melamine by weight. Heating was done in an aluminum can using electric heating tape. A slurry formed at 275° F. Holes were then punched in the can bottom, allowing the slurry to drip. A plastic sheet spread on the ground caught the falling prills as they dropped from the fourth story level.

The largest prills did not cool before landing and smashed. However, the smaller prills cooled and solidified, and were collected for strength testing. Fairly good strength results were achieved, although not measured. Crush strength would be expected to be similar to the granules of Example 7.

EXAMPLE 10

Melamine Agglomerated with a Latex Binder

5% Union Carbide UCAR 368 Latex, 15% water, and 80% melamine were combined into a flowable slurry. A sheet of the slurry was formed and then dried. An extremely strong composite resulted which could be granulated. The dried material contained 3% latex solids and 97% melamine. The crush strength of 3-4 mm. granules was 4.8 lbs.

EXAMPLE 11

Pressed Composite of Melamine and Urea-Formaldehyde 25 grams of urea, 70 grams melamine, and 15 ml. of 27% formaldehyde solution were mixed together and pressed at 300° F. and 500 psi to form a thick sheet. Crush strength of 3-4 mm. granules was 1.5 lbs.

EXAMPLE 12

Melamine-Urea Agglomerates for Field Trials

For field trials, 16,000 pounds of melamine/urea composites were made using 4 foot diameter pan agglomerators. Different composites were produced, at the melamine/urea ratios of 80/20, 75/25, and 67/33. Approximately 7% of the composites was provided by the urea added in the form of an aqueous binder solution, and the remaining urea was provided by powdered urea that was blended with the melamine powder prior to agglomeration.

GENERAL

In the foregoing examples, granular fertilizer products were prepared from commercially available, fine crystals of melamine. Similar granular fertilizer products can be prepared in substantially the same fashion from the hydroylsis products of melamine, i.e. ammeline, ammelide, and cyanuric acid, and from salts made from them and from melamine. Among the salts, the reaction product of nitric acid and melamine is a preferred material.

As with all fertilizer products, the granules should be made up for the specific use intended, if possible. For example, an essentially insoluble binder is preferred when the granular fertilizer product is to be used for tree seedlings, or when the granules are to be applied in a slurry of water or of a water solution of a readily soluble, fast release nitrogen fertilizer such as, for example, UN-32. UN-32 is a commercially available product that is a combination of urea and ammonium nitrate.

Where the granules are to be broadcast on the surface, soaked, then turned under, generally either a soluble or insoluble binder, or a combination, may be used. The important result or objective to be attained is the distribution in the soil of essentially discrete fine particles of the poorly or slightly soluble nitrogen source as specified. Self-agglomerated crystals of melamine, for example, do not yield the effective, desired fertilizer action in the soil, presumably because the self-agglomerates make difficult or too slow the action in the soil of water and/or microorganisms.

Demonstrations of Use of the Invention

EXAMPLE 13

Field Trials with Potatoes

Field trials were conducted in Quincy loam soil. Standard fertilizer practice on this particular land is expected, if followed, to produce from about 25 to about 35 tons of potatoes per acre, with an average figure being about 30.

For comparison, an aqueous slurry was prepared of melamine and water, in an agitated supply tank. This was connected to a sprayer, and the slurry was simply sprayed over the surface of the ground early in March, 1980. This produced an evenly distributed layer of fine particles of melamine on the surface of the ground.

The melamine was then mixed into the soil to a depth of about 6 inches. The soil was then turned over by plowing it to a depth of 14 inches. This distributed the melamine particles at depths in the range from about 6 inches to about 14 inches from the surface of the soil. Seed potatoes were then planted on April 1.

From time to time, petiole nitrogen analyses and tuber counts were taken.

For evaluation purposes, several different plots were treated in the manner described above. A control plot received no applied fertilizer nitrogen. Other plots received different amounts of melamine, applied in the manner described above. In addition, a plot was treated in accordance with standard fertilizer practice (SFP). Generally there was at least one replication plot prepared for each plot treated in the manner just described.

The petiole nitrogen analyses are reported in Table IV below.

TABLE IV

Petiole Nitrogen Analyses of Potatoes, at Different Levels of Melamine Application

| Melamine Application | Petiole Nitrogen, P.P.M. NO$_3$ | | | |
|---|---|---|---|---|
| lbs.N/acre | 7/16 | 7/22 | 7/30 | 8/13 |
| 0 (Control) | 1100 to 1500 | | | |
| 66 | 1700 | 1600 | 6000 | 7100 |
| 130 | 2500 | 2200 | 11200 | 10300 |
| 260 | 2600 | 4100 | 13000 | 13100 |
| 390 | 2600 | 2500 | 11200 | 11600 |
| SFP* | 16400 | 18800 | 20600 | 16500 |

*Standard Fertilizer Practice, 600 pounds nitrogen per year, applied as 16-20-0 material based on monoammonium phosphate, and the balance through the application of UN-32.

A comparison of the petiole nitrogen values reported in Table IV indicates that the melamine in the soil seemingly released nitrogen, that is useful to the potatoe plants, at a later time or slower rate than occurs when standard fertilizer practice is followed.

Some measurements were also made on the root, vine, and tuber weights during the growing season, as reported below in Table V.

TABLE V

Root, Vine, and Tuber Weights of Potatoes, at Different Levels of Melamine Application

| Melamine Application, lbs N/acre | Root Wt. g. 8/5 | Vine Wt. g. 8/5 | Tuber Wt. g. 8/5 | 10/8 |
|---|---|---|---|---|
| 0 (Control) | 187 | 853 | 4180 | ** |
| 66 | 180 | 680 | 3220 | ** |
| 130 | 200 | 1440 | 5380 | 8310 |
| 260 | 220 | 1920 | 7900 | 12920 |
| 390 | 180 | 1440 | 5820 | 9960 |
| SFP* | 260 | 7700 | 7980 | 10960 |

*Standard Fertilizer Practice, 600 pounds nitrogen
**Died-preharvest due to verticullum wilt While the results reported in Table V above indicate very favorable results at a melamine application rate of 260 pounds of nitrogen per acre, the results are not clear cut. Some of the potato plants involved may have been heavy-bearing mutants. Other potato plants involved may have been effected by the verticullum wilt.

However, for whatever the data may be worth, on August 5, the potatoes that had been fertilized with melamine at the rate of 260 pounds of nitrogen per acre produced vines whose weight was 1920 grams, whereas potatoes fertilized in accordance with standard fertilizer practice in the area produced vines having weights of 7700 grams. However, when comparing the weights of the tubers produced, it would appear that the smaller amount of melamine, in terms of applied nitrogen per acre, was substantially as effective as standard fertilizer practice. Supplementing the data in Table IV, the number of tubers noted on that same date in a linear five foot section of the plot treated with melamine at the 260 pounds N per acre rate produced an average of 53 tubers. In contrast, similar counts made on sections of five linear feet length that had been treated in accordance with standard fertilizer practice generated an average tuber count of 44 tubers. This would appear to be a substantial increase in tuber count, in favor of the melamine fertilizer applied at a much lower rate of applied nitrogen per acre than standard fertilizer practice.

Soil samples taken October 8 were tested, showing that at each level of melamine application, about 50% of the melamine remained in the soil after the growing season.

In the second year, on the same areas, without the addition of further nitrogen, the following petiole nitrogen results were obtained on new potato plants.

TABLE VI

Second Year Petiole Nitrogen Analyses of Potatoes, at Different Levels of Melamine Application

| Melamine Applied in First Year, lbs N/acre | Petiole Nitrogen, PPM NO$_3$ | | |
|---|---|---|---|
| | June | July | August |
| 0 | 9500 | 7000 | potatoes died, early August |
| 66 | — | — | — |
| 130 | 18000 | 4600 | 7000 |
| 260 | 13750 | 11000 | 10000 |
| 390 | 19600 | 7800 | 9800 |
| SFP* | 33000 | 18000 | 41000 |

*Standard Fertilizer Practice, 650 pounds nitrogen added the second year.

Second year vine weight and tuber weight were also measured.

TABLE VII

Vine and Tuber Weights of Potatoes, at Different Levels of Melamine Application

| Melamine Applied in First Year, | | Vine Wt. g. | | | Tuber Wt. g. |
|---|---|---|---|---|---|
| lbs N/acre | Aug. | Sept. | Oct. | Aug. | Sept. |
| 0 Control | — | — | | | |
| 66 | died | early | — | — | |
| 130 | 1440 | died | — | 5800(79)** | 3840(49)** |
| 260 | 1380 | died | — | 3960(34) | 5980(43) |
| 390 | 1940 | died | — | 5260(57) | 4620(37) |
| SFP* | 4970 | died | — | 5840(42) | 8960(61) |

*Standard Fertilizer Practice, 650 pounds nitrogen added again the second year; but SFP would required crop rotation.
**The numbers in () are numbers of tubers per 5' of row.

These results show that nitrogen was available to the potatoes in the second year from melamine applied the previous year.

The quality of the potatoes fertilized with melamine is considered to be average as to smoothness and uniformity. The quality of the potatoes produced following standard fertilizer practice is slightly lower.

The relatively poor yield (weights of tubers) from plants fertilized with melamine is believed to be attributable to the deaths of the associated vines two to three weeks earlier than the death of the vines fertilized according to Standard Fertilizer Practice. All of the vines died because of disease believed to be caused or brought on by failure to follow good crop rotation practice in this instance.

EXAMPLE 14

Potato Trials: Effect of Different Rates of Application

Melamine urea agglomerates were prepared using Ex. 1 techniques, at a ratio of 67/33 melamine/urea. These agglomerates were applied as a source of fertilizer nitrogen to potatoes. For comparison, commercial urea/prills were also applied to comparison plantings.

A control planting was treated with commercial urea-ammonium nitrate according to local Standard Fertilizer Practice.

The potatoes were the Russet Burbank variety. The observations made are summarized in Table VIII below.

TABLE VIII

Potato Trials - Effect of Different Application Rates

| Applied Nitrogen lbs./Acre | Melamine/ Urea Ratio | Petiole Nitrogen Analysis** | | | | Weight (Sept.) | | No. of Tubers*** |
|---|---|---|---|---|---|---|---|---|
| | | June | July | Aug. | Sept. | Vine | Tuber | |
| 143 | 67/33 | 12,000 | 8100 | 2000 | 6500 | 1040 g. | 6560 g. | 68 |
| 164 | 0/100 | 15,000 | 15,600 | 2500 | 1700 | 1640 | 8700 | 51 |
| 272 | 67/33 | 15,600 | 9700 | 2000 | 3100 | 960 | 9120 | 97 |
| 328 | 0/100 | 19,700 | 16,500 | 5000 | 9800 | 2390 | 8620 | 54 |
| 408 | 67/33 | 22,220 | 13,100 | 2000 | 4200 | 1800 | 9280 | 65 |
| 492 | 0/100 | 22,550 | 19,900 | 14,700 | 21,400 | 6320 | 6360 | 42 |
| 650 | 100* | 11,900 | 16,600 | 14,100 | 28,400 | 3810 | 7440 | 43 |

*Standard Fertilizer Practice. [urea/ammonium nitrate.]
**ppm nitrate.
***Number of tubers per plant measured in Sept.

On July 25, the melamine composite treated plants were compact, having few blooms. The urea treated plants had long vines and numerous blooms. The standard fertilizer practice treated plants had excessive vine growth, when compared to the agglomerated melamine/urea composite-treated plants.

EXAMPLE 15

More Potato Trials; Application for a Second Year

Melamine-urea agglomerates prepared as in Ex. 1 were applied to a one acre plot that had been treated the previous year with a malemine slurry. In the earlier application, the slurry had been sprayed on the surface of the soil, and then was first disced under, then ploughed in, to place the freshly applied discrete particles of melamine at a depth of 6" to 14", approximately. The agglomerates applied in the second year were broadcast on the soil surface by a spreader, then turned under, as before, to place them at a depth of 6"-14".

Standard fertilizer practice for potatoes in all second year trials described in these examples calls for the application of 650 lbs. N/acre per year. This is accomplished by the application of 600 lbs. of 16-20-0 material based on monoammonium phosphate, and the balance through the application of UN-32. First year trials were made when SFP was to apply 600 lbs. N/acre per year, primarily from monoammonium phosphate.

The observations made are reported in Table IX below.

TABLE IX

Potato Trials; Application for a Second Year

| Second Year Nitrogen Applied lbs./Acre | Second Year Nitrogen Source, Melamine/Urea Agglomerates | Pounds of Melamine Nitrogen Per Acre, First Year | Petiole Nitrogen Analysis, Second Year, ppm Nitrate | | | | Tuber Data Weight (Sept., Second Year) | |
|---|---|---|---|---|---|---|---|---|
| | | | June | July | Aug. | Sept. | Tuber | No. |
| 130 | 67/33 | 130 | 11,000 | 4,100 | 2,200 | died* | 5,840 | 42 |
| 260 | 67/33 | 260 | 15,000 | 7,750 | 14,000 | died* | 4,700 | 47 |
| 390 | 67/33 | 390 | 21,000 | 12,200 | 12,200 | died* | 4,640 | 46 |
| 0 | — | 0 | 9,500 | 10,000 | 7,000 | died* | 2,460 | 35 |
| 650, | — | | 23,800 | 41,000 | 20,900 | died | 8,960 | 61 |

Standard Fertilizer Practice
*Actually died 2-3 weeks earlier than plants on SFP.

The earlier deaths of the melamine-urea treated vines reported in Table IX is attributable to their enhanced susceptibility to disease because of planting potatoes in the same field two years in a row. The SFP field had not had potatoes planted on it the previous year. Tuber quality from melamine-urea agglomerate fertilized areas was average, while that from areas subjected to standard fertilizer practice was less than average.

EXAMPLE 16

Grape Trials

A. First Year

Gewurztraminer grapes were tested using melamine per se, in the first year, in a small vineyard. There were 540 2 year old Vinifera grape plants per acre. The soil is a shallow sandy soil with a caliche sub-base. General quality of the soil is poor, but it is well suited for Vinifera grape production.

Complete rows of 66 plants were tested at each nitrogen level. Full length rows between the treated rows were used as controls. Replicates were not deemed necessary because of the size of the plots, each row being considered a plot. No nitrogen fertilizers had been used since these grapes were first planted. The vineyard owners felt that conventional nitrogen fertilizer materials are too readily absorbed, stimulating vine growth rather than fruit production.

In March of the first year, furrows 5 inches deep by 10 inches wide were made at a 12 inch distance from the center of the plants, along each side of each row. A slurry of fine crystalline particles of melamine in water was sprayed directly into each furrow, placing the melamine alongside of, and slightly above, the grape roots. The furrows were then back filled with soil.

For these grape studies, the melamine applications were made at the rates of about 60 lbs., 90 lbs., and 120 lbs. of N/acre. If consideration is given to the slow rate of release, the application rate per season should be the annual application rate divided by a factor, probably of about 2.

Table X below reports on rates of application to the several test plots (rows).

TABLE X

| | Rates of Fertilizer Nitrogen Application to Test Plots for Grapes | | |
|---|---|---|---|
| | Rates of Application in Lbs. N/Acre | | |
| Plot No. | Melamine | $(NH_4)SO_4$ | Total |
| 1 | 60.0 | — | 60.0 |
| 2 | 89.9 | — | 89.9 |
| 3 | 120.0 | — | 120.0 |
| 4 | 54.0 | 6.0 | 60.0 |
| 5 | 80.9 | 9.0 | 89.9 |
| 6 | 107.9 | 12.0 | 119.9 |
| 7 | — | 12.0 | 12.0 |
| 8[1] | — | — | — |

[1] Alternating rows served as controls; there were several.

Lush vine growth, which tends to be produced by warm weather and readily available nitrogen (nitrate) in the soil with sufficient soil moisture, is believed to interfere with the process by which the vines harden for winter survival. Some vine varieties are more susceptible than others. These experiments with melamine, a very slow release nitrogen source, were therefore of potentially great significance for grape growers. Accordingly the vines were checked each week.

The entire vineyard, outside of the test plot area received an application of standard practice fertilizer nitrogen, UN-32, at 50 lbs. N/acre, about the first of June. UN-32 is a commercial fertilizer consisting of ammonium nitrate and urea. It was also applied to certain of the test plots, already treated, for a more careful comparison; see Table XI, below. In the following few weeks, vine growth was more abundant in the areas treated with UN-32, as compared to vine growth in the test plots. The melamine-treated grapes had less cane growth and lesser degrees of green color, as compared to the UN-32 fertilized vineyard area, but pollination and bunch size appeared about the same.

During late June and early July, the entire vineyard was irrigated every seven days because of 90° F.–100° F. weather.

Grape yields at harvest, and bunch counts, are reported in Table XI below. Data from UN-32 treated areas of the vineyard, outside of the test plot area, are included to provide a comparison with results obtained from standard fertilizer practice.

Grapes harvested from Plots 1–6 were compared as to pH. Differences were small. Grapes harvested from Plots 1–7 were compared as to sugar content and acid content. The small differences observed appeared to be in favor of the use of the invention.

TABLE XI

| | Grape Yields and Bunch Counts | | | | | | | |
|---|---|---|---|---|---|---|---|---|
| | Nitrogen Fertilizer Applied, lbs. N/Acre | | | Yield of Grapes, lbs./plant, Average of 8 plants | | Bunch Count per Plant, Average of 8 plants | | Weight/ 100 grapes, in grams | |
| Plot No. | Melamine | Ammonium Sulfate | UN-32 | Fertilized | Control[1] | Fertilized | Control[1] | Fertilized | Control[1] |
| 1 | 60.0 | — | — | 17.6 | 13.8 | 117 | 108 | 142 | 149 |
| 2 | 89.9 | — | — | 19.2[2] | 16.7 | 135[2] | 127 | 144 | 130 |
| 3 | 120.0 | — | — | 18.1[3] | 18.1 | 123[3] | 131 | 144 | 148 |
| 4 | 54.0 | 6.0 | — | 15.6 | 19.5 | 123 | 114 | 139 | 128 |
| 5 | 80.9 | 9.0 | — | 11.5 | 16.0 | 83 | 121 | 145 | 134 |
| 6 | 107.9 | 12.0 | — | 13.4 | 15.3 | 126 | 126 | 130 | 144 |
| 7 | — | 12.0 | — | 12.4 | 16.0 | 104 | 120 | 134 | — |
| 9 | 60.0 | — | 50 | 20.0 | 13.8 | 131 | 108 | | |
| 10 | 90.0 | — | 50 | 17.2 | 16.7 | 116 | 127 | | |
| 11 | 120.0 | — | 50 | 24.9 | 18.1 | 131 | 131 | | |
| 12 | 54.0 | 6.0 | 50 | 15.6 | 19.5 | 123 | 114 | | |
| 13 | 80.9 | 9.0 | 50 | 11.5 | 16.0 | 83 | 121 | | |
| 14 | 107.9 | 12.0 | 50 | 13.4 | 15.3 | 126 | 126 | | |
| 15 | — | — | 50 | 18.8[4] | 13.8 | 115[5] | 108 | | |
| 16 | — | — | 50 | 24.6[4] | 16.7 | 156[5] | 127 | | |
| 17 | — | — | 50 | 16.1[4] | 18.1 | 115[5] | 131 | | |

TABLE XI-continued

Grape Yields and Bunch Counts

| Plot No. | Nitrogen Fertilizer Applied, lbs. N/Acre | | | Yield of Grapes, lbs./plant, Average of 8 plants | | Bunch Count per Plant, Average of 8 plants | | Weight/ 100 grapes, in grams | |
|---|---|---|---|---|---|---|---|---|---|
| | Melamine | Ammonium Sulfate | UN-32 | Fertilized | Control[1] | Fertilized | Control[1] | Fertilized | Control[1] |
| 18 | — | — | 50 | 21.8[4] | 19.5 | 130[5] | 114 | | |
| 19 | — | — | 50 | 15.8[4] | 16.0 | 109[5] | 121 | | |
| 20 | — | — | 50 | 18.3[4] | 15.3 | 118[5] | 126 | | |

[1]The control plants were in rows immediately adjacent the fertilized rows.
[2]3% of the bunches were not mature and therefore were not saleable (not included in reported weight).
[3]4% of the bunches were not mature and therefore were not saleable (not included in reported weight).
[4]Average of all, i.e. plots 15-20; 19.2. Generally excessive vine growth was observed in these plants. In addition, two samples measured 10% and 17% immature and unsaleable grapes (not included in reported weight).
[5]Average of all, i.e. plots 15-20; 123.8.

B. Second Year

In the second year trials, the same plots and plants were used. Melamine-urea agglomerates, prepared as in Ex. 1, having an 80/20 melamine/urea ratio, were shanked into the ground at a depth of about 8", next to the roots. Bunch counts and yields were observed or estimated, respectively, in September, as reported below in Table XII.

TABLE XII

Grape Trials: Second Year of Application

| Melamine Application, lbs. Nitrogen/ acre Year 1 | Year 2 | Melamine/ urea Ratio | Bunches/ Plant Sept. |
|---|---|---|---|
| 60 | 0 | 100/0 | 74 |
| 0 | 60 | 80/20 | 54 |
| 90 | 0 | 100/0 | 57 |
| 0 | 90 | 80/20 | 71 |
| 120 | 0 | 100/0 | 80 |
| 0 | 120 | 80/20 | 81 |
| 50 | 0 | UN 32 | 68 (6 plant average) |
| 0 | 0 | — | 58 (2 plant average) |

EXAMPLE 17

Rice Trials

The present invention provides a technique to overcome the problem of the leaching out of fertilizer nitrogen sources in heavily water burdened soils of the kind used for growing rice.

Two trials were run. Plot No. 1, consisting of 3.5 acres, had been treated earlier in the year, according to local standard fertilizer practice, with nitrogen at 18 lbs/acre and phosphorus at 48 lbs $P_2O_5$ per acre. For this trial, prills having a ratio of 75 parts melamine to 25 parts urea binder were applied using a spinner spreader.

Plot No. 2, consisting of 3 acres, had not received any pre-season nitrogen application prior to the trials. It was treated with 75/25 prills at the same rate as Plot No. 1.

Standard fertilizer practice during the growing season for the adjoining plots, for comparison, was 100 lbs/acre of 18-48-0, and 130-140 lbs. N/acre as aqua ammonia, shanked into the soil to a depth of 4 inches, prior to planting.

The rice emerged above water about two weeks after planting. An application of Bolero herbicide was made during the period between the 14th day and 18th day after planting, at the rate of 40 lbs. of 10 G material, for grass control.

Heads per square foot are reported in Table XIII below.

TABLE XIII

Rice Head Counts and Crop Yields

| Plot No. | Lbs. N/Acre Applied Separate Applications | Total | Nitrogen Fertilizer Used | Rice Height (in.) | Head Count Per 9 Sq. Ft. 8/8 | 9/9 |
|---|---|---|---|---|---|---|
| 1 | 100) 18) | 118 | 75/25 M/U prills 18:48:0 | 34 | 557 | 614 |
| | 150) 18) | 168 | 75/25 M/U prills 18:48:0 | 37 | 516 | 489 |
| | SFP* | 153 | see footnote* | 40 | 497 | 397 |
| 2 | 50 | | 75/25 M/U prills | 30 | 222 | 306 |
| | 100 | | 75/25 M/U prills | 30 | 242 | 237 |
| | 150 | | 75/25 M/U prills | 30 | 236 | 266 |
| | 0 | | — | — | — | 217 |
| | SFP* | | see footnote* | 40 | 521 | 393 |

*Standard Fertilizer Practice: 130-140 lbs. aqueous ammonia and 100 lbs 18:48:0 which combined equal 153 lbs N/acre.

When melamine/urea prilled composites are applied to rice, generally there is a substantial increase in the extent of tillering, or putting forth of sprouts from the base of the original heads. However, the rice trials reported in this example did not live up to expectation. Plot 2 was flooded from the side, and urea may have washed away prematurely, so that tillering was reduced. In Plot 1, the rice head counts were huge. This plot was flooded from a corner, so less impact would be expected.

Generally, the rice grown under standard fertilizer practice conditions was taller than the melamine-treated rice, and its straw looked heavier.

EXAMPLE 18

Corn Trials

Corn trials were conducted in sandy soil in a series of plots of a half acre each within a 103 acre field. The melamine was shanked into the soil as a slurry in water, at a depth of about 200 mm. (8 inches) below the surface. The following table shows the ear count per 100 plants at different levels of application of melamine, and the ear weight per 100 plants.

TABLE XIV

Ear Count and Ear Weight of Corn at Different Levels of Melamine Application

| Plot # | Melamine Application Rate As Pounds N Per Acre | Ear Count/ 100 Plants | Ear Wt/100 Plants, g. |
|---|---|---|---|
| 11 | 68 | 103 | 19110 |
| 22 | 141 | 111 | 24540 |
| 33 | 208 | 111 | 25520 |
| 55 | Control* | 100 | 19660 |

*Ammonium sulfate applied at the rate of 43 lbs nitrogen/acre.

The average number of ears per plant appears to have been increased slightly by the use of melamine, shanked in. The average weight of the ears also appears to have been increased somewhat, but the rate of melamine application was well above that of the control.

EXAMPLE 19

Corn Trials Using Melamine-Urea Agglomerates; Evaluation of Different Application Techniques Test plots totaling 40 acres of sandy to light loams and silts were treated with different amounts of melamine agglomerates to provide several different levels of applied nitrogen per acre. Melamine-urea agglomerated composites were used, prepared according to Example 1 and having 67 parts melamine to 33 parts urea binder; 75 parts melamine to 25 parts urea binder; and 80 parts melamine to 20 parts urea binder. The composites were successfully applied using different techniques: 1) spreading with a Barber spreader; 2) spreading with a Barber spreader and plowing into the ground; 3) aerial application by airplane; 4) shanking into the ground during planting.

The results observed are summarized in Table XVA below.

TABLE XVA

Corn Trials - Effect of Application Method

| Nitrogen Level (lbs./acre) | Melamine/ Urea | Application Technique | Number of Ears/100 Plants | Average Number of Ears per Plant |
|---|---|---|---|---|
| 140-150 | 75/25 | (1) | 155 | 1.55 |
| 140-150 | 75/25 | (2) | 147 | 1.47 |
| 140-150 | 75/25 | (3) | 155 | 1.55 |
| 150 | 80/20 | (4) | 153 | 1.53 |
| 0 | (Control) | — | 132 | 1.32 |
| 400 | UN-32 | ** | 129 | 1.29 |
| 400* | * | | 145 | 1.45 |

*Standard Fertilizer Practice, several applications during the growing season.
**A total of 400 lbs. N in the form of UN-32 applied in several applications during the growing season to simulate Standard Fertilizer Practice.

All of the test corn plantings reported in these examples, where compared, were made within one week of each other if not essentially simultaneous.

Corn grown in plots fertilized by method (2), broadcasting, then plowing in, looked green and robustly healthy. Corn grown in plots fertilized by broadcasting only, methods (1) and (3), had yellow as well as green foliage, but was greener than corn fertilized by method (4), shanking in post-planting, which looked yellow.

In an effort to approximate yields which would not be available until later in the year, the ear counts in the same samples were retaken with the following adjustments: full ears recorded as 1, small ears as ½, and nubbins as 0. This count has been recorded in Table XVB as effective ear counts.

TABLE XVB

Corn Trials - Effect of Application Method

| Nitrogen Level (lbs./acre) | Melamine/ Urea | Application Technique | Effective Number of Ears/100'** | Number of Plants/100 ft. | Average Effective Number of Ears per Plant |
|---|---|---|---|---|---|
| 140-150 | 75/25 | (1) | 109.5 | 109 | 1.0 |
| 140-150 | 75/25 | (2) | 118 | 126 | 0.94*** |
| 140-150 | 75/25 | (3) | 120.5 | 115 | 1.05 |
| 150 | 80/20 | (4) | 60 | 134 | 0.45 |
| 0 | (Control) | — | 40.5 | 95 | 0.43 |
| 400 | UN-32 | (1) | 124.5 | 128 | 0.97 |
| 400* | * | | 145.5 | 159 | 0.92 |

*Standard Fertilizer Practice, several applications during the growing season.
**Full ears recorded as 1, small ears as ½, and nubbins as 0
***Ear sizes were also of interest:
at 150 lbs. N, applied as a 75/25 melamine/urea prill: 5-½-6 cm. diam.
SFP: 4-½-5 cm. diam.

In a further evaluation, corn plants were harvested and weighed, an ear count was taken, and ear weights were recorded, from two test areas. The first area was fertilized with 75/25 melamine/urea agglomerates by broadcasting the agglomerates, then discing them in. The second area was fertilized according to local standard fertilizer practice at 400 lbs. N/acre. Standard fertilizer practice calls for the application of a total of 350 lbs. to 400 lbs. N per year per acre. This is accomplished by three separate steps. First, an early application is made of 200 lbs. N/acre as anhydrous ammonia. Second, 400 lbs./acre of 16-20-0 is applied (based on monoammonium phosphate). Third, UN-32, comprised of urea and ammonium nitrate, is applied through the irrigation sprinkler system. The results are summarized in Table VXI below. All samples taken were pre-dent.

TABLE XVI

Pre-dent Evaluation of Corn Response

| Fertilization | Sample No. | Selection Technique | Plants Number | Weight | Ears Number | Weight | Ratio of Ear Weight to Plant Weight |
|---|---|---|---|---|---|---|---|
| Melamine/urea 75/25 | 1 | Random[1] | 10 | 39 lbs. | 20 | 18.5 lbs. | 0.475 |
| Agglomerates, at | 2 | Random[1] | 10 | 35.5 | 20 | 16 | 0.45 |
| 150 lbs. N/acre, broadcast and disced | 3 | all taken from a 50 ft. row | 58 | 122 | 59 | 47.5 | 0.39 |
| 75/25 Agglomerates, at 325 lbs. N/acre, broadcast and disced | 4 | all taken from a 50 ft. row | 69 | 122 | 73 | 49.5 | 0.41 |
| 75/25 Agglomerates, at 150 lbs. N/acre, flown on | 5 | all taken from a 50 ft. row | 64 | 134 | 67 | 47.5 | 0.35 |
| Standard Fertilizer | 1 | Randon[1] | 10 | 41 | 20 | 14 | 0.34 |
| Practice, 350 to 400 | 2 | Random[1] | 10 | 41 | 20 | 16.5 | 0.40 |
| lbs. N/acre | 3 | all taken from a 50 ft. row | 79 | 142 | 77 | 47 | 0.33 |

[1]In the random selection process, large plants have 2 ears each were taken from the ends of rows in open spots where there was a minimum of competition from other corn plants.

The data in Table XVI indicate that when the ratio of ear weight to plant weight is observed, the melamine/urea agglomerates have generated more weight of productive units per unit weight of foliage than did the standard fertilizer practice.

EXAMPLE 20

Further Corn Trials, Using Melamine-Urea Agglomerates; Evaluation of Different Melamine:Urea Proportions Agglomerates were prepared by using the techniques of Example 1, with a broad spectrum of different proportions of melamine to urea. In all of these trials, the fertilizer was applied by shanking it into the soil after the corn had been planted and had sprouted sufficiently to define the rows.

At approximately six months after planting, observations were made on the number of ears/100 plants, the number of plants per 100 feet, and the average number of ears per plant. The results are reported in Table XVII below. As in Ex. 13, effective ear counts were taken.

TABLE XVII

Corn Trials, Agglomerates at Different Melamine:Urea Proportions

| Applied lbs. N/Acre | Melamine Urea Ratio* | Number of Ears/ 100 Plants | Average Number of Ears per Plant | Effective Number of Ears/100' | Number of Plants/100' | Average Effective Number of Ears per Plant |
|---|---|---|---|---|---|---|
| 150 | 0/100 | 148 | 1.48 | 120.5 | 178 | 0.68 |
|  | 10/90 | 155 | 1.55 | 104.5 | 180 | 0.58 |
|  | 20/80 | 132 | 1.32 | 111.5 | 149 | 0.75 |
|  | 30/70 | 131 | 1.31 | 143.0 | 192 | 0.74 |
|  | 40/60 | 148 | 1.48 | 134.5 | 186 | 0.72 |
|  | 50/50 | 98 | 0.98 | 134.0 | 176 | 0.76 |
|  | 60/40 | 160 | 1.60 | 129.0 | 156 | 0.83 |
|  | 70/30 | 120 | 1.20 | 134.0 | 179 | 0.75 |
|  | 80/20 | 153 | 1.53 | 101.0 | 182 | 0.55 |
|  | 90/10 | 139 | 1.39 | 110.5 | 160 | 0.69 |
|  | 100/0 | 141 | 1.41 | 86.0 | 162 | 0.53 |
| 0 | Control | 132 | 1.32 | 81.0 | 190 | 0.43 |
| 400 | UN-32 | 129 | 1.29 | 124.5 | 128 | 0.97 |
| 400, | Standard Fertilizer Practice | 145 | 1.45 | 145.5 | 159 | 0.92 |

*All melamine urea trials, shanked in after plant emergence.

The data in Table XVII is interpreted as indicating that shanking in the melamine-containing agglomerates, or melamine per se, is not an effective technique. The results also tend to indicate that pre-planting application would be more effective.

EXAMPLE 21

Corn Trials: Effect of Different Rates of Application of 75/25 Melamine:Urea Agglomerates Agglomerates prepared by Ex. 1 techniques at 75/25 melamine:urea were applied at several different rates. The observations made are summarized below in Table XVIII. The effective number of ears was also measured as in Ex. 13.

TABLE XVIII

Corn Trials; Effect of Different Application Rates and Techniques

| Applied lbs N/Acre | Melamine/ Urea Ratio | Mode of Application | Sept. Average Number of Ears/ 100 Plants | Sept. Average Effective Number of Ears/Plant |
|---|---|---|---|---|
| 107 | 75/25 | Shanked pre-planting | 1.85 | 0.45 |
| 150 | 75/25 | Broadcast & disc | 1.47 | 0.94 |
| 235 | 75/25 | Broadcast & disc | 1.59 | 0.92 |
| 150 | 0/100 | Shanked after planting | 1.50 | 0.68 |
| 0 | Control | — | 1.32 | 0.43 |
| 400, Standard Fertilizer Practice | UN-32 | Broadcast and applied in irrigation water | 1.45 | 0.92 |

EXAMPLE 22

Wheat Trials

The effect of melamine applications at different levels was studied on the wheat crop in soils generally classified as sandy to light loams and silts.

Each trial was in one 2-acre plot. The several plots used were in a large section of land having very sandy soil to a depth of over five feet. This land had been planted to field corn in the previous year. Stalk residues were left on the surface, which was disced before planting and after planting. The pre-planting discing was done after the application of the melamine slurry to the land.

While a simple melamine slurry was applied to the soil in three of the test areas, in three others the liquid vehicle of the slurry was an ammonium sulfate solution, and in a control plot, no fertilizer nitrogen was applied. The rates of application are reported in Table XIX below.

TABLE XIX

Rates of Fertilizer Nitrogen Application to Test Plots for Wheat

| | Rate of Application in Lbs. N/Acre | | |
|---|---|---|---|
| Plot No. | Melamine | (NH$_4$)$_2$SO$_4$ | Total |
| 1 | 66.6 | — | 66.6 |
| 2 | 133.2 | — | 133.2 |
| 3 | 200 | — | 200. |
| 4 | 60 | 6.66 | 66.6 |
| 5 | 120 | 13.3 | 133.3 |
| 6 | 100 | 20 | 200 |
| 7 | — | 20 | 20 |
| 8 Control | — | — | — |

The melamine was applied as a sprayed-on slurry in water using an Orchard Master 3 point sprayer having a 28-foot boom. The nozzles operate at 40 psi. Nugaines wheat at 96 pounds per acre was flown onto the land by plane and disked into the soil two days later, about March 17. Unfortunately, all plots received an application of urea solution by inadvertence, at a rate of about 100 pounds N/acre, through the irrigation sprinklers, on May 11.

This eliminated the control plot and nullified this wheat evaluation work as to some of its objectives. However, three areas of evaluation were still possible from these plots. First, the toxicity of melamine when used on wheat could be evaluated by making measurements of plant stand and yield. Secondly, the use of melamine as a supplemental nitrogen source to replace water-soluble nitrate nitrogen that may have leached from the soil after long periods of irrigation can be evaluated. Soil samples were taken on March 11 and on May 27 to establish a base amount of available nitrogen in the top 18 inches of soil. Periodic subsequent sampling showed N movement in the soil. And third, it was still possible to evaluate whether melamine delivers nitrogen to the soil for more than one growing season. If the nitrogen leaching were significant, the yields from the melamine plots should show increased yields at harvest time.

The soil sample nitrate analyses are reported in Table XX below.

TABLE XX

Soil Sample Nitrogen Analyses

| | Lbs. N/Acre | Nitrate Nitrogen, PPM | |
|---|---|---|---|
| Plot No. | Applied 3/17 | 3/11 | 5/27 |
| 1 | 66.6 M[1] | 5.8 | 5.82 |
| 2 | 133.2 M | 4.3 | 6.32 |
| 3 | 200. M | 1.5 | 11.95 |
| 4 | 60 M + 6.7 AS[2] | 4.0 | 7.28 |
| 5 | 120 M + 13.3 AS | 1.8 | 2.60 |
| 6 | 180 M + 20 AS | 4.8 | 1.60 |
| 7 | 20 AS | —[3] | 7.71 |
| 8 Control | — | 7.4 | 3.96 |

[1]M = melamine
[2]AS = ammonium sulfate
[3]Specimen of soil lost, so no value is reported.

While the figures report erratic results, the trend seems to indicate that the insertion of melamine alone in the soil produced a substantial increase in available nitrate in the soil about 70 days after the insertion.

The count on the heads of wheat is reported below in Table XXI.

TABLE XXI

Count of Heads of Wheat

| Plot No. | Melamine Application lbs N/acre | Heads of Wheat per ft$^2$ | Increase over Control |
|---|---|---|---|
| 1 | 66 | 52.6 | 57% |
| 2 | 133 | 55.9 | 67% |
| 3 | 200 | 55.0 | 65% |

TABLE XXI-continued

| Plot No. | Count of Heads of Wheat | | |
|---|---|---|---|
| | Melamine Application lbs N/acre | Heads of Wheat per ft$^2$ | Increase over Control |
| 8 Control | none | 33.4 | |

The increase in heads of wheat from melamine nitrogen appears to show that the melamine insertion was effective in increasing the productive units in wheat.

CONCLUSION

Pre-planting application of the melamine or the fertilizer material is preferred, but not essential. The fine particles of melamine, or of its hydrolysis products, or of their salts, should be distributed in the soil to permit the action of water and soil microorganismis on the particles. The preferred mode of application is to broadcast the particles, which may be in the form of granules, apply water through the sprinklers of an irrigation system, and then turn over the soil in such a way as to effect a good distribution of essentially discrete fertilizer particles in the soil, all before planting.

It appears to be important that the fertilizer particles be distributed throughout the soil in such fashion that individual particles are positioned to permit the action thereon of water and microorganisms. Slurry application as a film or thin layer in the bottom of a wide trench, that is later filled with soil, leads to good results. Shanking in seems to bunch the particles together rather than spread them apart, and the observed results tend to be disappointing.

When the particles are formed into granules, the binder should release the individual particles in the soil in such a way that self-agglomeration of the particles is avoided. In other words, the particles should be released from the granule in such a way that they remain essentially discrete. Any application technique that tends to concentrate particles together in the soil can be expected to lead to less than desired results, because the particles of melamine and other members of the group identified earlier may clump if moistened, and when clumped, seem to resist dissolution by water and/or degradation by microorganisms.

The rate of application of the particulate slow release material, in the first year of its application, may be from 10% to 75% of the rate of application for the entire growing season of a standard, readily soluble, fast release nitrogen fertilizer material. A good fast release material for such comparative purposes is a mixture of urea and ammonium nitrate, such as UN-32. Preferably the rate of application according to the invention is from 15% to 50% that of the standard, and more preferably, from 20% to 45%. For the second and succeeding years, even lower rates may be used, since there is some carryover from year to year.

In the foregoing examples, the hydrolysis products of melamine and their salts, and the salts of melamine, may be used in place of melamine, with comparable results.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for furnishing a source of fertilizer nitrogen to field soil as a nutrient source for a crop comprising:
applying directly onto or in the soil at depths down to about 14 inches a material selected from the group consisting of melamine, the mineral acid salts of melamine, and mixtures thereof in the form of granules, said granules being in the form of discrete particles and providing a source of nitrogen fertilizer values, are from 1 mm. to 10 mm. in size, and consist of a mixture comprising:
an amount from 10% to 90% by weight of said granules of said discrete particles and
an effective amount by weight of said granules of a binder that is soluble in water to the extent of 20 grams or more per 100 grams of pH 7 water at 20° C. and that binds said discrete particles in a form that is granular and that, after distribution of the granules in the soil, permits the action of moisture and microorganisms on said discrete particles,
said granules being suitable in granule strength and weight for mechanical dispensing and for application to or into the soil, and
the average crush strength of a sample of said granules, selected to have sizes of 3 mm. to 4 mm., being at least one pound per granule;
said granules being further characterized by slow conversion in the soil to a form in which the nitrogen content thereof is useful to plant life growing in the soil, the amount of said granules applied for a single growing season being from 10% to 75% of the amount for the entire growing season of a conventional fertilizer material that is soluble to the extent of 20 grams or more per 100 grams of pH 7 water at 20° C., said amounts being based upon the nitrogen contents of the said granules and of said conventional fertilizer material, respectively.

2. The process of claim 1, wherein said binder is water soluble to the extent of 20 grams or more per 100 grams of pH 7 water at 20° C. and comprises at least 15% by weight of said granules.

3. The process of claim 2 wherein the binder for the granules is a material selected from the group consisting of ammonium sulfate, potassium sulfate, ammonium phosphate, diammonium phosphate, the potassium phosphates, ammonium nitrate, potassium nitrate, potassium chloride, ammonium chloride and mixtures thereof.

4. The process of claim 2, wherein said binder is urea and comprises at least 20% of said granules by weight, and said particles have sizes not above about 400 micrometers in largest dimension.

5. The process of claim 4 wherein the binder is urea that has been solidified from the molten state, and wherein said process comprises incorporating said granules in the soil.

6. The process of claim 4 wherein said binder is solidified from the molten state, and wherein said process comprises incorporating said granules in the soil.

7. The process of claim 4 wherein said granules are agglomerates, and said particles are melamine particles and comprise from 60% to 85% by weight of said mixture, and wherein said process comprises incorporating said granules in the soil.

8. The process of claim 5 wherein said granules are prills, and said particles are melamine and comprise from 10% to 67% by weight of said mixture, and wherein said process comprises incorporating said granules in the soil.

9. The process of claim 1, comprising applying said particles in the form of granules that in the soil are a source of nitrogen fertilizer values, that are from 1 mm. to 10 mm. in size, and that consist of a mixture comprising:

an amount not above 99% by weight of said granules of said discrete particles and an effective amount of at least 1% by weight of said granules of a water-insoluble binder that binds said discrete particles in a form that is granular, and that, after distribution of the granules in the soil, permits the action of moisture and microorganisms on said individual discrete particles, said granules being suitable in granule strength and weight for mechanical dispensing and for application to or into the soil, and the average crush strength of a sample of said granules, selected to have sizes of 3 mm. to 4 mm., being at least one pound per granule.

10. The process of claim 9, wherein said particles have sizes not above about 400 micrometers in largest dimension.

11. The process of claim 10, wherein the amount of said binder is at least 2% by weight of said granules, and wherein said granules are formed by agglomerating a mixture of said particles and said binder and causing said binder to bind said particles in granular form.

12. The process of claim 11, wherein at least a part of the binder is applied as a spray to said particles and comprises a solution of a lignin sulfonate salt.

13. The process of claim 11, wherein the amount of said binder is at least 5% by weight of said granules and is selected from the group consisting of a urea-formaldehyde resin, a melamine-formaldehyde resin, and a lignin sulfonate salt.

14. The process of claim 11, wherein said binder comprises at least 5% by weight of said granules and is applied as a latex.

15. The process of claim 1, comprising applying said particles onto or in the soil in an aqueous slurry of particles that are suspended in the slurry.

16. The process of claim 1, comprising applying said particles to the surface of the soil prior to planting, applying water to the particles and soil as through an irrigation sprinkler system, and then disrupting the soil as by discing, rototilling, or plowing, to distribute the applied particles at the desired depths within the soil.

17. The process of claim 1, wherein said particles are melamine particles and said binder is urea, comprising applying said granules to the surface of the soil prior to planting, applying water to the granules and soil as through an irrigation sprinkler system, and then disrupting the soil as by discing, rototilling, or plowing, to distribute the applied granules at the desired depths within the soil.

18. The process of claim 1, comprising applying said granules by inserting and distributing them in said field soil, said granules being formed of particles of melamine of maximum dimension not above about 400 micrometers, with a urea binder, the proportion of melamine to urea being in the range from 10 to 90 parts of melamine to 90 to 10 parts of urea, by weight.

* * * * *